(12) United States Patent
Smith (10) Patent No.: US 11,968,919 B2
(45) Date of Patent: Apr. 30, 2024

(54) SEED TREATER

(71) Applicant: D. Landon Smith, Parker City, IN (US)

(72) Inventor: D. Landon Smith, Parker City, IN (US)

(*) Notice: Subject to any disclaimer, the term of this patent is extended or adjusted under 35 U.S.C. 154(b) by 4 days.

(21) Appl. No.: 17/652,410

(22) Filed: Feb. 24, 2022

(65) Prior Publication Data

US 2022/0272891 A1 Sep. 1, 2022

Related U.S. Application Data (60) Provisional application No. 63/154,368, filed on Feb. 26, 2021.

(51) Int. Cl.
  *A01C 1/06* (2006.01)
(52) U.S. Cl.
  CPC ...................................... *A01C 1/06* (2013.01)
(58) Field of Classification Search
  CPC .......................................................... A01C 1/06
  USPC ................................................ 47/56.7, 57.7
  See application file for complete search history.

(56) References Cited

U.S. PATENT DOCUMENTS

| | | | |
|---|---|---|---|
| 3,545,129 A | 12/1970 | Schreiber et al. | |
| 3,976,030 A | 8/1976 | Ragsdale et al. | |
| 4,079,696 A | 3/1978 | Weber | |
| 4,116,163 A * | 9/1978 | Torelli | B27N 1/0263 427/214 |
| 4,514,114 A * | 4/1985 | Fuss | A01C 7/125 406/146 |
| 5,236,507 A | 8/1993 | Brown | |
| 5,392,707 A | 2/1995 | Romans | |
| 5,447,565 A | 9/1995 | Song et al. | |
| 5,632,819 A | 5/1997 | Geissler | |
| 6,551,402 B1 | 4/2003 | Renyer et al. | |
| 6,783,082 B2 | 8/2004 | Renyer et al. | |
| 7,083,069 B2 | 8/2006 | Wysong et al. | |
| 7,380,733 B2 | 6/2008 | Owenby et al. | |
| 7,428,874 B2 | 9/2008 | Jones et al. | |
| 8,177,095 B1 | 5/2012 | Renyer et al. | |
| 8,342,366 B2 | 1/2013 | Renyer et al. | |

(Continued)

FOREIGN PATENT DOCUMENTS

| | | | | |
|---|---|---|---|---|
| DE | 2642340 A1 * | 9/1976 | | A01C 1/08 |
| DE | 20 2010 000 159 U1 | 5/2010 | | |

*Primary Examiner* — Magdalena Topolski
*Assistant Examiner* — Spencer T Callaway
(74) *Attorney, Agent, or Firm* — Maginot, Moore & Beck LLP (57) ABSTRACT

A seed treating assembly includes a chute assembly, a first metering roller, a second metering roller, at least one nozzle, a tunnel structure, a trough, and a wiper shaft having a wiper membrane. The chute assembly includes a first inclined treating surface and a second inclined treating surface spaced apart from the first inclined treating surface. The first metering roller is supported by the chute assembly and is configured to meter a first seed curtain of seeds to the first inclined treating surface. The second metering roller is supported by the chute assembly, and is configured to meter a second seed curtain of seeds to the second inclined treating surface. The least one nozzle is supported by the chute assembly. The at least one nozzle is configured to spray the first seed curtain and the second seed curtain with a liquid treatment spray.

14 Claims, 6 Drawing Sheets

(56) References Cited

U.S. PATENT DOCUMENTS

| | | | |
|---|---|---|---|
| 8,348,103 B1 | 1/2013 | Renyer et al. | |
| 8,393,502 B2 | 3/2013 | Renyer et al. | |
| 8,573,917 B2 | 11/2013 | Renyer | |
| 8,644,993 B1 | 2/2014 | Craft et al. | |
| 8,839,941 B2 | 9/2014 | Fehr et al. | |
| 8,910,778 B1 | 12/2014 | Francisco et al. | |
| 8,985,931 B2 | 3/2015 | Kaeb et al. | |
| 9,038,861 B2 | 5/2015 | Renyer et al. | |
| 9,497,899 B2 | 11/2016 | Glowa et al. | |
| 9,616,442 B2 | 4/2017 | Kaeb et al. | |
| 9,630,779 B2 | 4/2017 | Kaeb et al. | |
| 9,675,001 B2 | 6/2017 | Meyer et al. | |
| 9,957,109 B2 | 5/2018 | Kaeb et al. | |
| 10,023,791 B1 * | 7/2018 | Corcoran | B65G 69/188 |
| 10,165,723 B2 | 1/2019 | Reineccius et al. | |
| 10,194,577 B2 | 2/2019 | Kaeb et al. | |
| 10,337,645 B2 | 7/2019 | Roberge et al. | |
| 10,543,989 B2 | 1/2020 | Francisco | |
| 2002/0117108 A1 * | 8/2002 | Pentecost | B01J 2/12 118/303 |
| 2012/0017812 A1 | 1/2012 | Renyer et al. | |
| 2012/0216458 A1 | 8/2012 | Renyer et al. | |
| 2012/0233916 A1 | 9/2012 | Renyer | |
| 2012/0234865 A1 | 9/2012 | Renyer | |
| 2012/0324786 A1 | 12/2012 | Renyer | |
| 2014/0263434 A1 | 9/2014 | Renyer et al. | |
| 2014/0263465 A1 | 9/2014 | Renyer | |
| 2014/0271243 A1 | 9/2014 | Craft et al. | |
| 2014/0318009 A1 | 10/2014 | Strahm et al. | |
| 2014/0373381 A1 | 12/2014 | Kaeb et al. | |
| 2014/0373441 A1 | 12/2014 | Kaeb et al. | |
| 2015/0334911 A1 | 11/2015 | Renyer et al. | |
| 2016/0060039 A1 | 3/2016 | Meyer et al. | |
| 2016/0272427 A1 | 9/2016 | Kaeb et al. | |
| 2017/0164550 A1 | 6/2017 | Kaeb et al. | |
| 2017/0189868 A1 | 7/2017 | Meyer et al. | |
| 2017/0274331 A1 | 9/2017 | Edelman et al. | |
| 2017/0355527 A1 | 12/2017 | Kaeb et al. | |
| 2018/0124994 A1 | 5/2018 | Kaeb et al. | |
| 2019/0009989 A1 | 1/2019 | Francisco | |
| 2019/0059205 A1 | 2/2019 | Meyer et al. | |

* cited by examiner

SEED TREATER

This application claims the benefit of priority of U.S. provisional application Ser. No. 63/154,368, filed on Feb. 26, 2021, the disclosure of which is herein incorporated by reference in its entirety.

FIELD

This disclosure relates to the field of coating systems for granular or particulate material, and, specifically, to seed treating systems and methods.

BACKGROUND

Agricultural workers use seed treating assemblies, commonly referred to as "seed treaters," to apply treatments to seeds before planting the seeds. Exemplary treatments include fertilizers, hormones, pesticides, herbicides, antimicrobials, fungicides, and the like. The treatment is are usually applied to the seeds as a liquid that dries to form an exterior coating on the seeds. Typically, the seeds are treated in batches and then the treated seeds are transported to the field for sowing.

The treatment or treatments applied to the seeds are typically very concentrated and very expensive. Furthermore, a prescribed amount of the treatment should be applied to the seeds for optimal effectiveness of the treatment. As a result, it is desirable for seed treaters to efficiently and uniformly apply the treatments to the seeds with minimal waste. Moreover, known seed treaters are expensive and can be difficult to operate. As a result, many farmers contract with service providers to have their seeds treated, instead of owning and operating their own seed treater. Based on the above, improvements to known seed treaters are desired.

SUMMARY

According to an exemplary embodiment of the disclosure, a seed treating assembly includes a chute assembly, a first metering roller, a second metering roller, at least one nozzle, a tunnel structure, a trough, and a wiper shaft having a wiper membrane. The chute assembly includes a first inclined treating surface and a second inclined treating surface spaced apart from the first inclined treating surface. The first metering roller is supported by the chute assembly and is configured to meter a first seed curtain of seeds to the first inclined treating surface. The second metering roller is supported by the chute assembly, and is configured to meter a second seed curtain of seeds to the second inclined treating surface. The least one nozzle is supported by the chute assembly. The at least one nozzle is configured to spray directly the first seed curtain and the second seed curtain with a liquid treatment spray. The tunnel structure extends from the chute assembly. The trough is supported by the tunnel structure. The wiper shaft is supported by the tunnel structure and is configured to rotate a wiper membrane extending from the wiper shaft. The trough is configured to collect the first seed curtain and the second seed curtain as collected seeds. The at least one nozzle is configured to spray directly the collected seeds in the trough with the liquid treatment spray. The rotation of the wiper shaft moves the wiper membrane to empty the collected seeds from the trough.

According to another exemplary embodiment of the disclosure, a method of treating seeds with a seed treating assembly includes metering untreated seeds with a first metering roller onto a first inclined treating surface as a first seed curtain, and spraying the first seed curtain with a liquid treatment spray emitted from a nozzle. The method further includes collecting the seeds of the sprayed first seed curtain in a trough, spraying the collected seeds with the liquid treatment spray emitted from the nozzle, and emptying the trough of the collected seeds.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
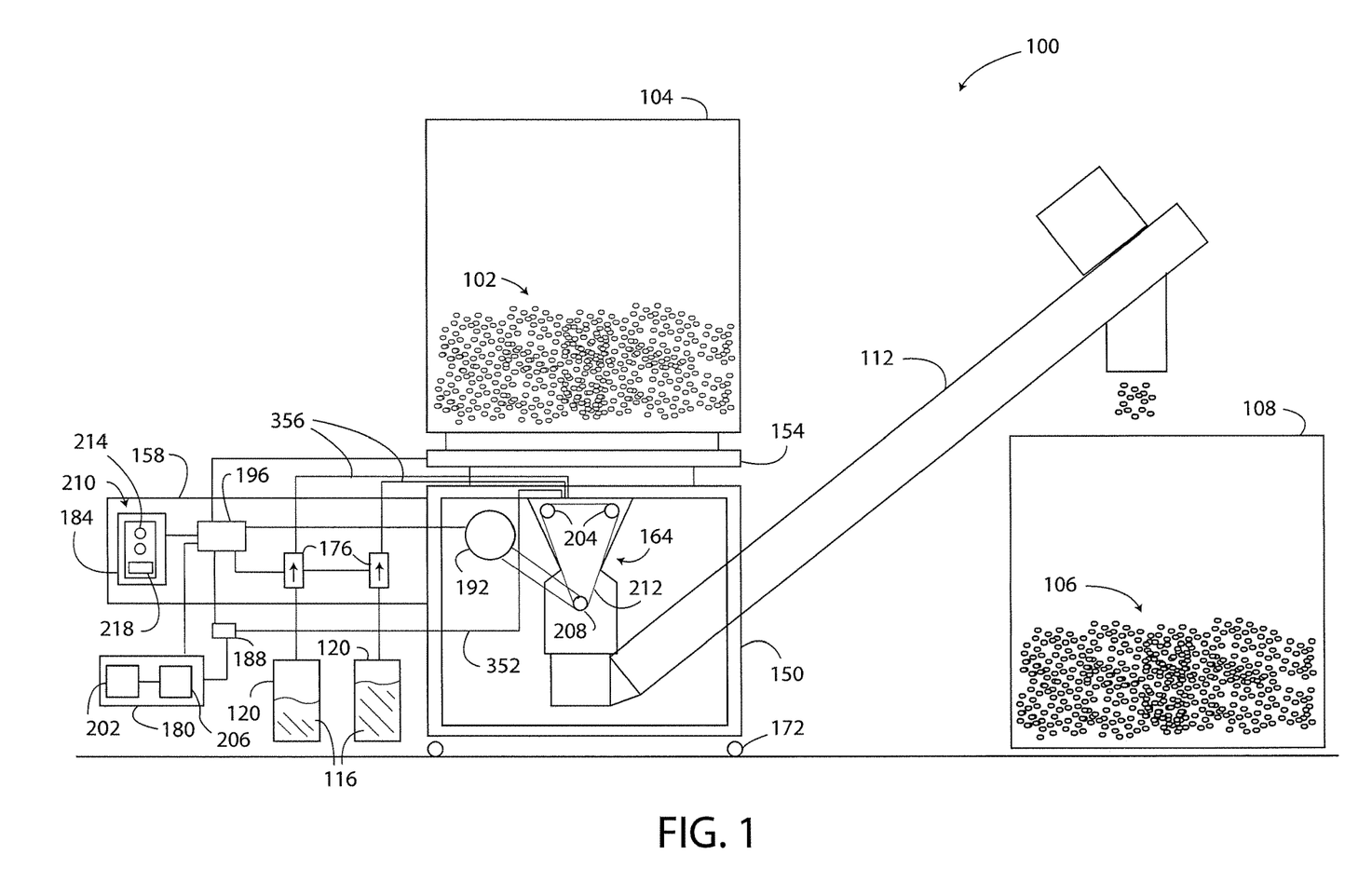
FIG. 1 is a diagram of a seed treating assembly according to the present disclosure, the seed treating assembly including a treating unit.

As shown in FIG. 1, a seed treating assembly 100 is configured to treat untreated seeds 102 withdrawn from a first container 104 and to transfer treated seeds 106 to a second container 108 with an auger assembly 112. Treating the untreated seeds 102 includes applying at least one coating (i.e. a liquid treatment 116) to the untreated seeds 102. The treatment 116 is pumped in a liquid form from a reservoir 120 and is sprayed onto the seeds 102. The seed treating assembly 100 is referred to as a box-to-box seed treating system, because the assembly 100 automatically transfers the untreated seeds 102 from the container 104, to a treating unit 164 to receive the treatment 116, and then to the second container 108. The seed treating assembly 100 applies the treatment 116 to the seeds 102 uniformly, at a desired dosage, and with little waste of the treatment 116. In at least one embodiment, the seed treating assembly 100 utilizes a loss-in-weight system to control the metering of the seeds 102 through the seed treating assembly 100. The seed treating assembly 100 is configured to apply the treatment 116 to any seed or "seed-like" particles, such as corn, soybeans, plastic pellets, and/or any other granule or granular material(s).

With continued reference to FIG. 1, the seed treating assembly 100 includes a frame 150, a scale 154, a control assembly 158, the treating unit 164, and the auger assembly 112. The frame 150 is formed from metal or another rigid material, such as plastic and/or composite materials. The frame 150 is positioned on the floor or a base, and is configured to support the container 104, the scale 154, the treating unit 164, and at least portions of the control assembly 158 and the auger assembly 112. In one embodiment, the frame 150 includes rollers, wheels, and/or casters 172, such that the frame 150 is easily movable. Moreover, the frame 150, in one embodiment, is sized to fit within a pickup truck bed so that the seed treating assembly 100 is easily transportable. That is, the frame 150, the scale 154, the control assembly 158, and the treating unit 164 can be easily moved as a unit and placed in the bed of a truck for easy transport.

The scale 154 is mounted to the frame 150 and is configured to weigh the container 104 and the particulate matter (i.e. the seeds 102) contained therein. Specifically, the scale 154 is located at least partially between the frame 150 and the container 104. The container 104 rests upon the scale 154 so that the scale 154 is configured to determine the weight of the container 104 and the untreated seeds 102 within the container 104. The scale 154 generates an electronic weight signal that is supplied to the control assembly 158. In one embodiment, the scale 154 subtracts the weight of the container 104 from the measured weight so that the electronic weight signal corresponds to the weight of the seeds 102 in the container 104. In one embodiment, the assembly 100 does not include the scale 154 and the container 104 is supported on the frame 150. The scale 154 is not required to effectively and to efficiently treat the seeds 102 using the treating unit 164.

The reservoirs 120 are containers for holding the treatments 116. As shown in FIG. 1, the seed treating assembly 100 includes two of the reservoirs 120. In other embodiments, the seed treating assembly 100 includes from one to five of the reservoirs 120. An exemplary reservoir 120 holds up to five gallons (nineteen liters) of the treatment 116. In other embodiments, the reservoirs 120 hold from one quart (one liter) to twenty gallons (seventy-six liters) of the treatment 116. The reservoirs 120 are formed from plastic, in one embodiment, and are removably mounted to the frame 150 for movement with the frame 150. According to a first configuration, the reservoirs 120 each include the same treatment 116. According to a second configuration, the reservoirs 120 include different treatments 116 that are both applied to the seeds 102 (either simultaneously or separately). According to a third configuration, a first reservoir 120 includes the treatment 116 and a second reservoir 120 includes a diluting agent, such as water. In one embodiment, the reservoirs 120 are spaced apart from the frame 150 and are fluidically connected to the treating unit 164 with a limited-spill coupling.

The control assembly 158 includes at least one pump 176, an air compressor 180, a switch panel 184, a regulator 188, and a motor 192 each operably connected to an electronic control unit 196. The control assembly 158 is typically mounted on the frame 150.

The at least one pump 176 is operably connected to at least one of the reservoirs 120 and to the treating unit 164. Specifically, a supply or input side of the pump 176 is connected to the reservoir 120 and an output side of the pump 176 is connected to the treating unit 164. Accordingly, the pump 176 is configured to pump the liquid contents of the reservoir 120 to the treating unit 164. In one embodiment, the pump 176 is a peristaltic pump driven by a brushless DC motor, such as the peristaltic pumps supplied by Anko Products, Inc. In one embodiment, the pump 176 is electronically configurable, by the electronic control unit 196, to provide a predetermined flow rate. The predetermined flow rate is from 0.3 ml/min to 2000 ml/min. The predetermined flow rate of the treatment 116 is used by the assembly 100 to dose the treatment 116. In particular, the predetermined flow rate is selected based on the requirements of the treatment 116 and the amount of the treatment 116 is that is desired to be applied (i.e. dosed) to the seeds 102. A higher flow rate tends to result in more of the treatment 116 being dosed to the seeds 102 than a lower flow rate.

Additionally or alternatively, the at least one pump 176 includes a pump head and motor that are configured to supply the treating unit 164 with a pressurized supply of the treatment(s) 116 contained by the reservoirs 120. In such an embodiment, no connection to a supply of pressurized air is required to treat the seeds 102, and the at least pump 176 supplies the liquid treatment(s) 116 at high pressure to the treating unit 164.

As shown in the exemplary embodiment of FIG. 1, the seed treating assembly 100 includes two of the pumps 176. In other embodiments, the seed treating assembly 100 includes from one to five of the pumps 176. In embodiments having more than one pump 176, the pumps 176 may be operably connected to a manifold (not shown) configured to mix the contents of the reservoirs 120 into a mixed treatment 116 and/or a diluted treatment 116 supplied to the treating unit 164 (such as mixing the treatment 116 with water to achieve a desired consistency), or the pumps 176 may be configured to supply the contents of the reservoirs 120 in an unmixed configuration to the treating unit 164.

The air compressor 180 is operably connected to the treating unit 164 and is configured to supply pressurized air to nozzles 200 (FIG. 2) of the treating unit 164. The air compressor 180 includes a tank 202 and a motor 206 configured to fill the tank 202 with pressurized air from the atmosphere. The pressurized air is also referred to herein as compressed air.

In FIG. 1, the air pressure regulator 188 is operably connected to the air compressor 180 and is configured to regulate the pressure of the pressurized air supplied to the nozzles 200. In one embodiment, the air pressure regulator 188 is electronically controllable and is electrically connected to the controller 196, so that the controller 196 can automatically adjust and control the pressure of the pressurized air supplied to the nozzles 200. Specifically, the air pressure regulator 188 is configurable to deliver a predetermined air pressure to the nozzles 200. In one embodiment, the predetermined air pressure is from five to fifteen psi (0.3 to 1.0 bar).

Some embodiments of the seed treating assembly 100 include a nozzle(s) 200 that does not require a supply of the pressurized air; accordingly, these embodiments typically do not include the air compressor 180 and the air pressure regulator 188.

The switch panel 184 includes a user interface 210 for controlling the operation of the seed treating assembly 100. In one embodiment, the switch panel 184 includes a plurality of input devices 214, such as switches, buttons, potentiometers, and the like, for adjusting operating parameters of the seed treating assembly 100. In certain embodiments, the switch panel 184 also includes a display screen 218 configured to display the operating parameters of the seed treating assembly 100. Exemplary operating parameters that are controlled and/or displayed using the user interface 210 include a speed of the motor 192, a seed metering rate (i.e. a predetermined seed metering rate), a flow rate of the pump(s) 176 (i.e. the predetermined flow rate), the predetermined air pressure from the air compressor 180 (as controlled by the regulator 188), and an estimated remaining time for treating the seeds 102 in the container 104. Any other desired parameter is also shown and/or controlled by the user interface 210.

The motor 192 is configured to rotate metering rollers 204 and a wiper assembly 208 of the treating unit 164, as described herein. In one embodiment, a chain and gear assembly 212 connects an output shaft of the motor 192 to the metering rollers 204 and the wiper assembly 208. Depending on a ratio of the gears of the chain and gear assembly 212, the metering rollers 204 and the wiper assembly 208 may be rotated at any speed relative to each other. That is, the motor 192 may rotate the metering rollers 204 faster, slower, or at the same speed as the wiper assembly 208. The motor 192 is operably connected to the control unit 196, which is configured to control and/or regulate the rotational speed of the motor 192 at a predetermined motor speed.

In another embodiment, the control assembly 158 includes a plurality of the motors 192. For example, in one embodiment, the control assembly 158 includes one of the motors 192 for each of the metering rollers 204 and the wiper assembly 208, for a total of three of the motors 192. In such an embodiment, the metering rollers 204 and the wiper assembly 208 are directly driven by the motors 192, and the system 100 does not include the chain and gear assembly 212. In a further embodiment, the metering rollers 204 are each operably connected to the same motor 192 and the wiper assembly 208 is operably connected to another motor 192 for a total of two of the motors 192. When more than one motor 192 is included, the control unit 196 is configured to individually and/or independently control the rotational speed of each motor 192 at a desired predetermined motor speed.

The control unit 196 is provided as a microprocessor, a processor, a controller, a programmable logic controller ("PLC"), or any other type of electronic control device configured to execute program instructions stored in a non-transitory electronic memory.

Figure 2:
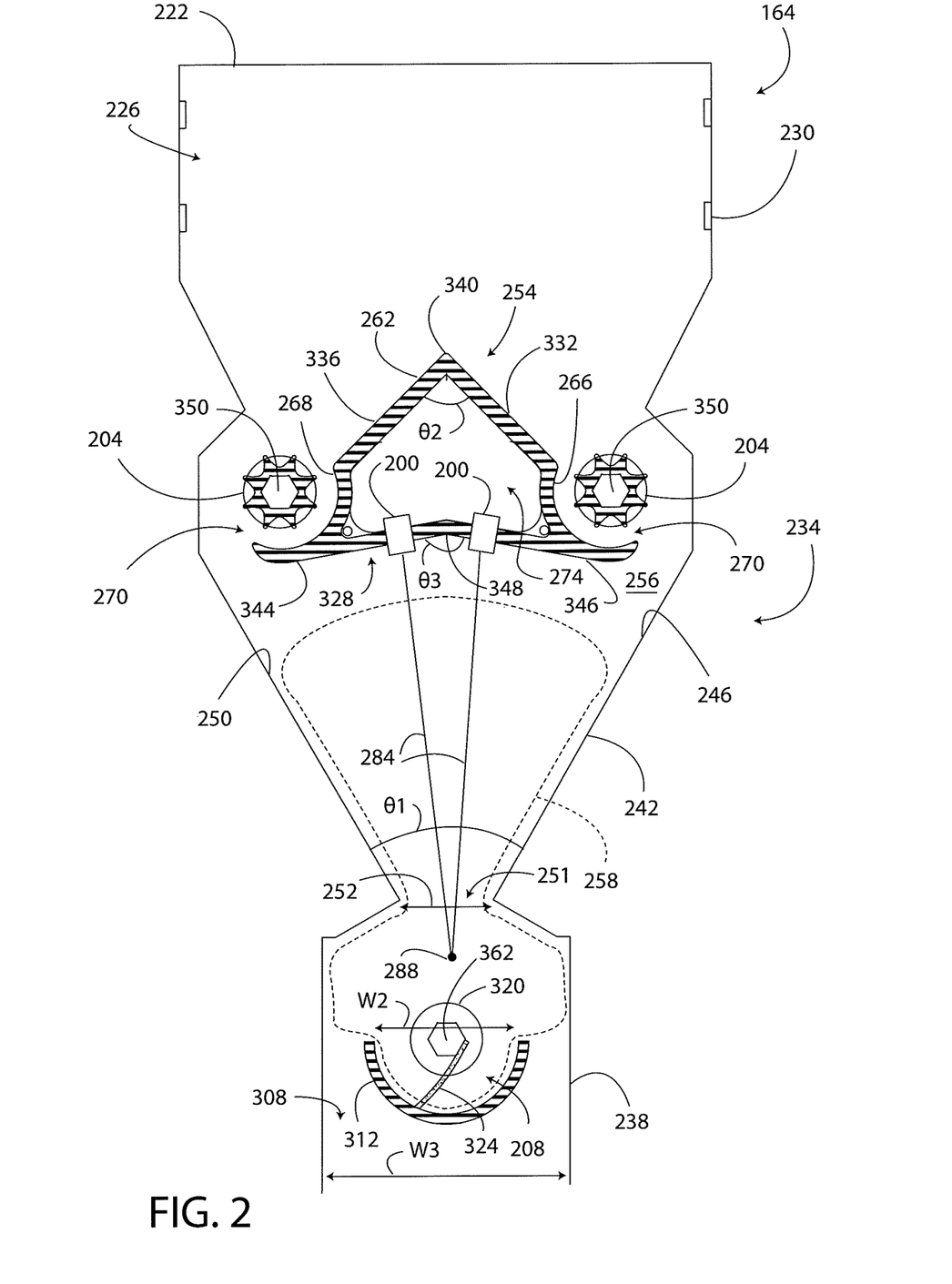
FIG. 2 is a cross-sectional view of the treating unit of the seed treating assembly of FIG. 1 shown without seeds.

As shown in FIG. 2, the treating unit 164 includes a hopper 230, a chute assembly 234 operably connected to the hopper 230, a baffle assembly 254 supported by the chute assembly 234, the metering rollers 204, the nozzles 200, and a tunnel structure 238 operably connected to the chute assembly 234. In one embodiment, portions of the hopper 230, the chute assembly 234, and the tunnel structure 238 are formed from sheet steel or sheet metal that is welded, screwed or otherwise fastened together.

The hopper 230 is operably connected to the container 104 and is configured to receive the untreated seeds 102 from the container 104. In one embodiment, the hopper is generally rectangular and defines a seed receiving opening 222 and a space 226 for holding the untreated seeds. In FIG. 2, the treating unit 164 is shown empty of the seeds 102. The seeds 102 fall into the hopper 230 by gravity, and the flow of the seeds 102 into the hopper 230 may be manually and/or electronically regulated using an adjustable flow control valve or gate valve that is operably connected to the output of the container 104.

The chute assembly 234 includes a tapered chute 242 having a first inclined treating surface 246 and an opposed second inclined treating surface 250 spaced apart from the first inclined treating surface 246. The treating surfaces 246, 250 are defined by inside surfaces of the structure of the chute assembly 234. The treating surfaces 246 form a "V" shape that is open at the bottom of the "V" to enable the seeds 102 to exit the chute assembly 234. That is, at a seed exit 251 of the chute assembly 234, the treating surfaces 246, 250 are spaced apart by a distance 252. In one embodiment, the treating surfaces 246, 250 are substantially rectangular and are each approximately 24 inches by 20 inches (61 cm by 51 cm). In other embodiments, depending at least on a volume of the seeds 102 to be treated, the treating surfaces 246, 250 are from 12 inches by 10 inches (30 cm by 25 cm) to 48 inches by 40 inches (122 cm by 102 cm). The distance 252, in one embodiment, is about six inches (15 cm) and in other embodiments is from three inches (8 cm) to twelve inches (30 cm). In an exemplary embodiment, an angle $\theta_1$ between the treating surfaces 246, 250 is about 70° (i.e., from 60° to 80°). In another embodiment, the angle $\theta_1$ between the treating surfaces 246, 250 is from 45° to 135°.

Figure 3:
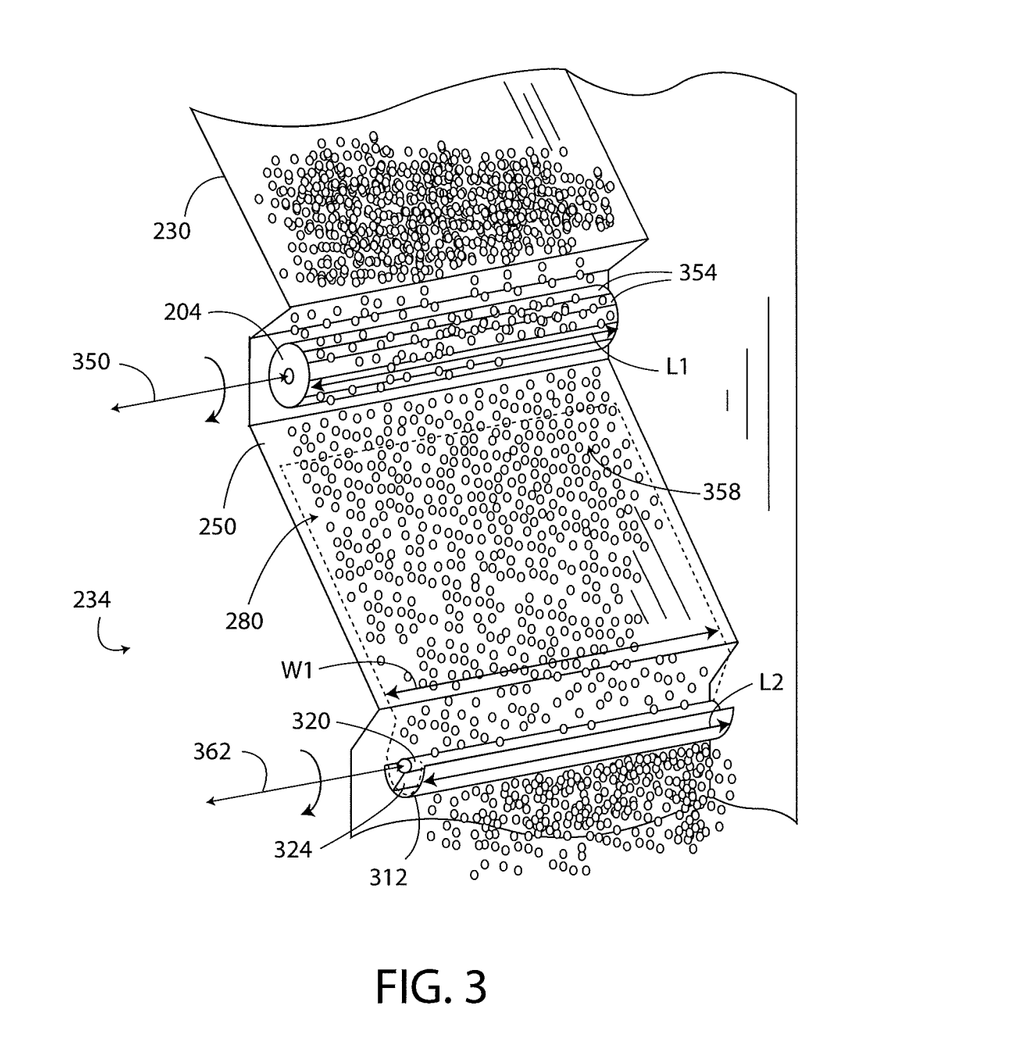
FIG. 3 is a cutaway perspective view of the treating unit of FIG. 2, shown with seeds.

As shown in FIG. 3, in one embodiment, the treating surfaces 246, 250 are substantially planar surfaces configured to receive the seeds 102, as metered by the metering rollers 204. As used herein, a substantially planar surface is flat and is free from ridges, grooves, and other irregularities. In another embodiment, the treating surfaces 246, 250 include ridges, grooves, and/or channels (not shown) configured to guide the seeds 102 toward the tunnel structure 238 and/or to break up clumps of the seeds 102. The treating surfaces 246, 250 are "inclined" with respect to a vertical plane. That is, the treating surfaces 246, 250 each define a plane that is non-coplanar with a vertical plane.

The treating surfaces 246, 250 are formed from steel, aluminum, and/or another rigid material, such as plastic and/or composite materials. In one embodiment, the treating surfaces 246, 250 include a non-stick coating, such as polytetrafluoroethylene (PTFE), anodized aluminum, and/or silica. The non-stick coating assists in the seeds 102 sliding down the chute assembly 234 and also tends to prevent sticking of the treatment(s) 116 to the chute assembly 234.

With reference again to FIG. 2, the inclined treating surfaces 246, 250 are located in and partially define a treating chamber 258 of the treating unit 164. The treating chamber 258 is partially defined by the treating surfaces 246, 250 and two V-shaped end surfaces 256 (one of which is shown in FIG. 2) that close the sides of the treating chamber 258. The treating chamber 258 is open at the top to receive the seeds 102, and is open at the bottom to allow the seeds 102 to exit the treating chamber 258.

As shown in FIG. 2, the baffle assembly 254 is supported by the chute assembly 234 and includes an angled dividing surface 262, a first curved metering surface 266, a second curved metering surface 268, and a nozzle plate 328. The angled dividing surface 262 is adjacent the hopper 230 and is at least partially located in the space 226. The angled dividing surface 262 includes a first inclined guide surface 332, a second inclined guide surface 336, and a peak 340 located between the guide surfaces 332, 336. The inclined guide surface 332 meets the inclined guide surface 336 at the peak 340. In one embodiment, the peak 340 is configured to distribute the seeds 102 approximately evenly to each of the metering rollers 204. The dividing surfaces 332, 336 are substantially planar, and an angle θ2 between the dividing surfaces 332, 336 is about 90° (i.e., from 80° to 110°). Accordingly, the dividing surfaces 332, 336 are inclined relative to a vertical plane at about 45°. In another embodiment, the dividing surfaces 332, 336 include ridges, grooves, and/or channels (not shown) configured to guide the seeds 102 toward the metering rollers 204 and/or to break up clumps of the seeds 102. In another embodiment, the angle θ2 of the dividing surfaces 332, 336 is from 20° to 160°, with a lower magnitude corresponding to steeper surfaces 332, 336.

The curved metering surfaces 266, 268 each extend from a respective guide surface 332, 336. The metering surfaces 266, 268, in one embodiment, are curved at a constant radius of about five inches (13 cm). In other embodiments, the radius of the metering surfaces 266, 268 is from 2.5 inches (6 cm) to 8 inches (20 cm). The radius of the metering surfaces 266 is selected to be larger than a corresponding radius of the metering rollers 204.

In one embodiment, a circumferential length of each metering surface 266, 268 is greater than 25% of a circumference defined by the radius of the corresponding metering surface 266, 268. For example, if the radius of the metering surface 266 is five inches (13 cm), then the circumference defined by the radius of the corresponding metering surface 266, 268 is 31.4 inches (80 cm), and the circumferential length of the metering surface 266, 268 is greater than 7.9 inches (20 cm).

As shown in FIG. 2, the nozzle plate 328 is adjacent to the treating chamber 258 and extends between the curved metering surfaces 266, 268. In the illustrated embodiment, the nozzle plate 328 includes a first plate portion 344 that is angled (i.e., angle θ3) with respect to a second plate portion 346. A vertex 348 of the angle θ3 is aligned with the peak 340. The angle θ3 is about 15° (i.e., 10° to 20°), and, in other embodiments, is from 5° to 30°. As described herein, the angle θ3 of the plate portions 344, 346 aims the nozzles 200. In other embodiments, the nozzle plate 328 is flat and the portions 344, 346 are co-planar.

The baffle assembly 254 defines a wiring tunnel 274. The wiring tunnel 274 is at least partially isolated from the treatment chamber 258 and the space 226 by the nozzle plate 328 and the inclined guide surfaces 332, 336. Accordingly, the treatment 116, as sprayed by the nozzles 200, is prevented from entering the wiring tunnel 274. An air supply line 352 (FIG. 1) from the air compressor 180 and a liquid treatment supply line 356 (FIG. 1) from the pumps 176 are connected to the nozzles 200 and extend through the wiring tunnel 274.

With reference to FIG. 2, the metering rollers 204 are supported by the chute assembly 234 and, when rotated by the motor 192, are configured to meter a defined amount of the untreated seeds 102 into metering channels 270, onto the inclined treating surfaces 246, 250, and into the treating chamber 258. As the seeds 102 are metered by the metering rollers 204, the seeds 102 fall as a seed curtain 280 (FIG. 3) onto the inclined treating surfaces 246, 250. As shown in FIG. 3, the seed curtain 280 is a mostly even distribution of the seeds with very little or no overlap of the seeds 102 on the treating surfaces 246, 250 so that each seed 102 of the seed curtain 280 is exposed to the sprayed treatment 116 from the nozzles 200. That is, in the seed curtain 280, very few, if any of the seeds 102 block or obscure other seeds 102 of the seed curtain 280 from exposure to the sprayed treatment 116. In a preferred configuration, the seed curtain 280 is a layer of the seeds 102 that is generally only a few seeds 102 thick so that each seed 102 or most seeds 102 of the seed curtain 280 are exposed to the sprayed treatment 116 from the nozzles 200. The seed curtain 280, in a more preferred configuration, is a layer of the seeds 102 that is generally one seed 102 thick so that each seed 102 of the seed curtain 280 is exposed to the sprayed treatment 116 from the nozzles 200.

As shown in FIG. 3, each metering roller 204 defines a length L1 parallel to a corresponding axis of rotation 350. The length L1 of the metering rollers 204 is about the same as a width W1 of the inclined treating surfaces 246, 250, such that each seed curtain 280 completely covers a corresponding one of the inclined treating surfaces 246, 250. In one embodiment, the length L1 is about the same as the width W1 when the length L1 and the width W1 are within 5% of each other. Each metering roller 204 defines a plurality of longitudinal slots 354 that extend along the axis of rotation 350. Each slot 354 is sized to hold and to move a plurality of the seeds 102. The metering rollers 204 are also referred to herein as metering wheels.

With reference again to FIG. 2, the metering rollers 240 are positioned relative to the baffle assembly 254 to each define a corresponding metering channel 270, which is also referred to herein as a metering chamber. In particular, the metering channels 270 are defined between the metering rollers 240 and the curved metering surfaces 268. The metering channels 270 are a pathway for the untreated seeds 102 to be transferred from the space 226 of the hopper 230 to the treatment chamber 258 to receive the treatment 116 from the nozzles 200 as the seed curtains 280. Specifically, when the metering rollers 204 are rotated by the motor 192, the seeds 102 fall into the slots 352 and are moved through the metering channels 270. At the end of the metering channels 270, the seeds 102 exit the metering channels 270 and fall from the metering surfaces 266, 268 onto the inclined treating surfaces 246, 250 as the seed curtains 280. The long parallel slots 354 of the metering rollers 204 evenly evacuate the seeds 102 from the metering channels 270 across the width W1 (FIG. 3) of the treating surfaces 246, 250 as the seed curtain 280 that is no more than a few seeds 102 thick. Gravity pulls and/or moves the seeds 102 of the seed curtain 280 across the treating surfaces 246, 250, to the tunnel structure 238, and to the trough 312 for collection by the trough 312. As the seeds 102 fall down the treating surfaces 246, 250, in one embodiment, the seeds 102 tumble and rotate as they fall so that all sides of the seeds 102 are exposed to the sprayed treatment 116.

As shown in FIG. 2, the nozzles 200 are mounted on an underside of the baffle assembly 254 (i.e. on the nozzle plate 328) opposite the dividing surface 262; accordingly, the nozzles 200 are supported by the chute assembly 234. Specifically, a first nozzle 200 is mounted on the plate portion 344 at a first angle, and a second nozzle 200 is mounted on the plate portion 346 at a second angle that is different than the first angle. The different angles of mounting, aim the nozzles 200 in different directions. The nozzles 200 are supported by the nozzle plate 328 so that the nozzles 200 are located between the metering rollers 204. The nozzles 200 are adjacent to and/or at least partially located within the treatment chamber 258. In one embodiment, the baffle assembly 254 includes two of the nozzles 200. In other embodiments, the baffle assembly 254 includes from one to ten of the nozzles 200.

In one embodiment, the nozzles 200 are operably connected to the air compressor 180 to receive a supply of the pressurized air via the air supply line 352. The nozzles 200 are also operably connected to an output of the pumps 176 to receive the liquid treatment 116 from the reservoir(s) 120 via the liquid treatment supply line 356. The nozzle plate 328 positions the nozzles 200 to emit a liquid treatment spray (i.e., an atomized spray 298 of the treatment 116 (FIG. 5)) into the treatment chamber 258 toward the tunnel structure 238 and onto the seed curtains 280.

The nozzles 200, in an exemplary embodiment, are air induction nozzles, air atomizing nozzles, and/or atomizing nozzles. Accordingly, the nozzles 200 configured as air induction nozzles, mix the pressurized air with the liquid treatment 116 to atomize the liquid treatment 116 into a very fine mist, fog, and/or very fine droplets of the liquid treatment 116 (i.e. the atomized spray 298), which also is referred to as the liquid treatment spray. The droplet size of the atomized spray 298 is very much smaller than the size of the seeds 102. Accordingly, each seed 102 is sprayed with numerous of the droplets of the treatment 116. For example, in one embodiment, assuming the seeds 102 and the droplets are generally spherical, the droplets of the atomized spray 298 each have a diameter that is approximately 0.1% to 5% of the diameter of one of the seeds 102. As such, the droplets of the atomized spray 298 are sized to easily pass through spaces 358 (FIG. 3) between the falling seeds 102 of the seed curtain 280 so that the entire seed curtain 280 and all sides of the tumbling seeds 102 are coated with the sprayed liquid treatment 116.

Suitable air induction nozzles 200 include the nozzles EB1010SS, EB1020SS, EB1030SS, and EB1040SS as made by the EXAIR® Corporation. These exemplary air induction nozzles 200 are supplied with five to fifteen psi of the pressurized air and deliver/spray from about three to forty liters per hour of the sprayed treatment 116 (i.e., a selected dosage of the treatment 116).

In another embodiment, the nozzles 200 are not connected to the air compressor 180 and the nozzles 200 are operably connected to the output of the pumps 176 to receive the liquid treatment(s) 116 from the reservoir(s) 120 via the liquid treatment supply line 356. In such an embodiment, the nozzle plate 328 positions the nozzles 200 to emit the atomized spray 298 of the treatment(s) 116 (FIG. 5)) into the treatment chamber 258 toward the tunnel structure 238 and onto the seed curtains 280. The atomized spray 298, in this embodiment, is developed by the nozzles 200, which receive the liquid treatment 116 under high pressure. The high pressure of the liquid treatment 116 and the configuration of the nozzles 200 causes the liquid treatment to atomize upon being emitted from the nozzles 200 and to form the atomized spray 298.

In one embodiment, the nozzles 200 define a flat fan spray pattern that is wider than the width W1 (FIG. 3) of the treating surfaces 246, 250, such that all of the seeds 102 of the seed curtain 280 are positioned to receive the sprayed liquid treatment 116. Moreover, the spray patterns of the nozzles 200 overlap each other, in one embodiment. For example, the spray patterns of the nozzles 200 may overlap from 30% to 70%.

With reference to FIG. 2, the nozzles 200 each define a spray axis 284 and an intersection 288 of the spray axes 284 is located outside of the tapered chute 242, below the treating surfaces 246, 250, and below the chute assembly 234. The intersection 288 is located in the tunnel structure 238 between the trough 312 and the first and the second inclined treating surfaces 246, 250. The spray axis 284 of the nozzle 200 is a center of a spray pattern of the nozzle 200. The spray axes 284 are adjustable and/or configurable by adjusting the positions of the nozzles 200 relative to the nozzle plate 328. Additionally, embodiments of the baffle assembly 254 having an angled nozzle plate 328 are configured to angle the spray axes 284 of the nozzles 200 accordingly.

With continued reference to FIG. 2, the tunnel structure 238 defines a tunnel 308 and supports a trough 312 and a wiper assembly 208. The tunnel structure 238 extends from the chute assembly 234 and is located below the chute assembly 234. In one embodiment, the treating chamber 258 extends into the tunnel 308. That is, due to the orientation of the nozzles 200, the atomized spray 298 extends directly into the tunnel structure 238 and onto the trough 312 and at least a portion of the wiper assembly 208. As a result, the trough 312 is sprayed directly with the liquid treatment 116 from the nozzles 200. Accordingly, as described herein, the same nozzles 200 are used to spray the seeds 102 of the seed curtains 280 and the seeds 102 caught by the trough 312 (FIG. 5).

The trough 312, in one embodiment, is a half-cylinder that is fixedly mounted to (i.e., supported by) the tunnel structure 238. As shown in FIG. 3, a length L2 of the trough 312 is approximately equal to the length L1 of the metering rollers 204. In one embodiment, the trough 312 defines a maximum width W2 of from two inches (5 cm) to six inches (15 cm) and is preferably about four inches wide (10 cm). That is, the trough 312 is formed from half of a four-inch cylinder divided lengthwise. The trough 312 is positioned to catch the seeds 102 of the seed curtains 280 as the seeds 102 fall out of the tapered chute 242 as collected seeds 360 (FIG. 5). To assist in catching the seeds 102, the width W2 of the trough 312 is greater than (i.e., longer) the distance 252 between the treating surfaces 246, 250. Gravity moves the seeds 102 of the seed curtains 280 across the first and second treating surfaces 246, 250 and to the trough 312. The width W2 of the trough 312 is less than a width W3 of the tunnel structure 238 so that the collected seeds 360 can exit the trough 312 and fall through the tunnel 308 towards the auger assembly 112. The trough 312, in some embodiments, is referred to as a collection trough.

As shown in FIG. 2, the wiper assembly 208 includes a wiper shaft 320 and a wiper membrane 324. The wiper shaft 320 is supported by the tunnel structure 238 and, in particular, is rotatably mounted on the tunnel structure 238 for rotation about an axis of rotation 362. The axes of rotation 350 of the metering rollers 204 and the axis of rotation 362 of the wiper shaft 320 are substantially parallel and non-coaxial. As used herein, axes are substantially parallel, when the axes are within 10° of each other.

The wiper shaft 320 is rotated by the motor 192. In one embodiment, the chain and gear assembly 212 operably connects the metering rollers 204, the wiper shaft 320, and the output shaft of the motor 192. Typically, the wiper shaft 320 rotates at the same or about the same rate/speed as the metering rollers 204. Alternatively, the wiper shaft 320 rotates at a different rate/speed than the metering rollers 204.

The wiper membrane 324 is mounted on the wiper shaft 320 for rotation with the wiper shaft 320. The wiper membrane 324 extends from the wiper shaft 320 to the trough 312. In one embodiment, the wiper membrane 324 is a rubber strip or an elastomer strip that is pressed, biased, or positioned against the trough 312. The rotation of the wiper shaft 320 moves the wiper membrane 324 to empty the collected seeds 360 from the trough 312 by pushing the collected seeds 360 out of the trough 312 and over the edge of the trough 312. In another embodiment, the wiper membrane 324 follows the curvature of the trough 312 but is spaced apart from the trough 312.

The tunnel structure 238 is connected to an input of the auger assembly 112. When the treated seeds 106 are pushed out of the trough 312 and fall to the bottom of the tunnel structure 238, the treated seeds 106 are lifted by an auger (not shown) of the auger assembly 112 and deposited in the container 108.

Figure 4:
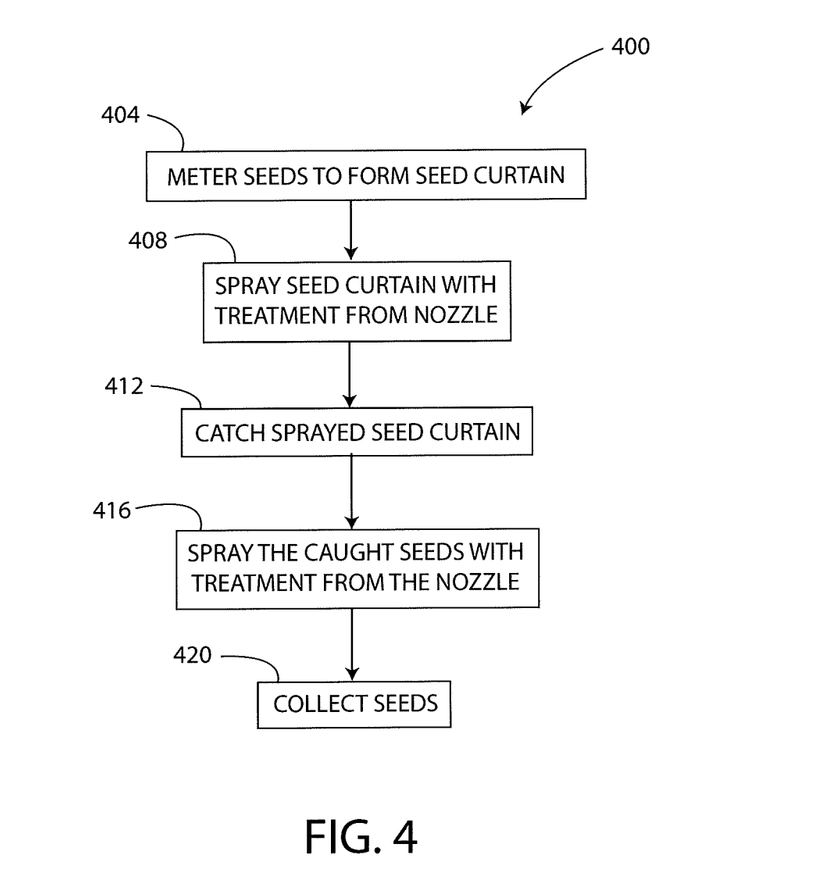
FIG. 4 is a flowchart illustrating an exemplary method of operating the seed treating assembly of FIG. 1.

In operation and with reference to the flowchart of FIG. 4, an exemplary method 400 of operating the seed treating assembly 100 is described. First, the seed treating assembly 100 is configured as shown in FIG. 1, with the container 104 of the untreated seeds 102 ready to be received by the treating unit 164, and with the auger assembly 112 positioned to transport the treated seeds 106 to the container 108.

At block 404 of the method 400, the user operates the user interface 210 to cause the assembly 100 to meter the seeds 102 from the container 104 into the treating unit 164. Specifically, to meter the seeds 102, the control unit 196 activates the motor 192, which rotates the metering rollers 204 as well as the wiper shaft 320. Moreover, upon activation of the motor 192, the control unit 196 also activates the pumps 176 and the air compressor 180 so that the nozzles 200 are supplied with the pressurized air and the liquid treatment 116 from the reservoirs 120. In response, the nozzles 200 generate the atomized spray 298 shown in FIG. 5. Embodiments of the system 100 having nozzles 200 that do not require the supply of the pressurized air from the air compressor 180, generate the atomized spray 298 in response to receiving the liquid treatment(s) 116 under high pressure, as pressurized by the pumps 176.

Figure 5:
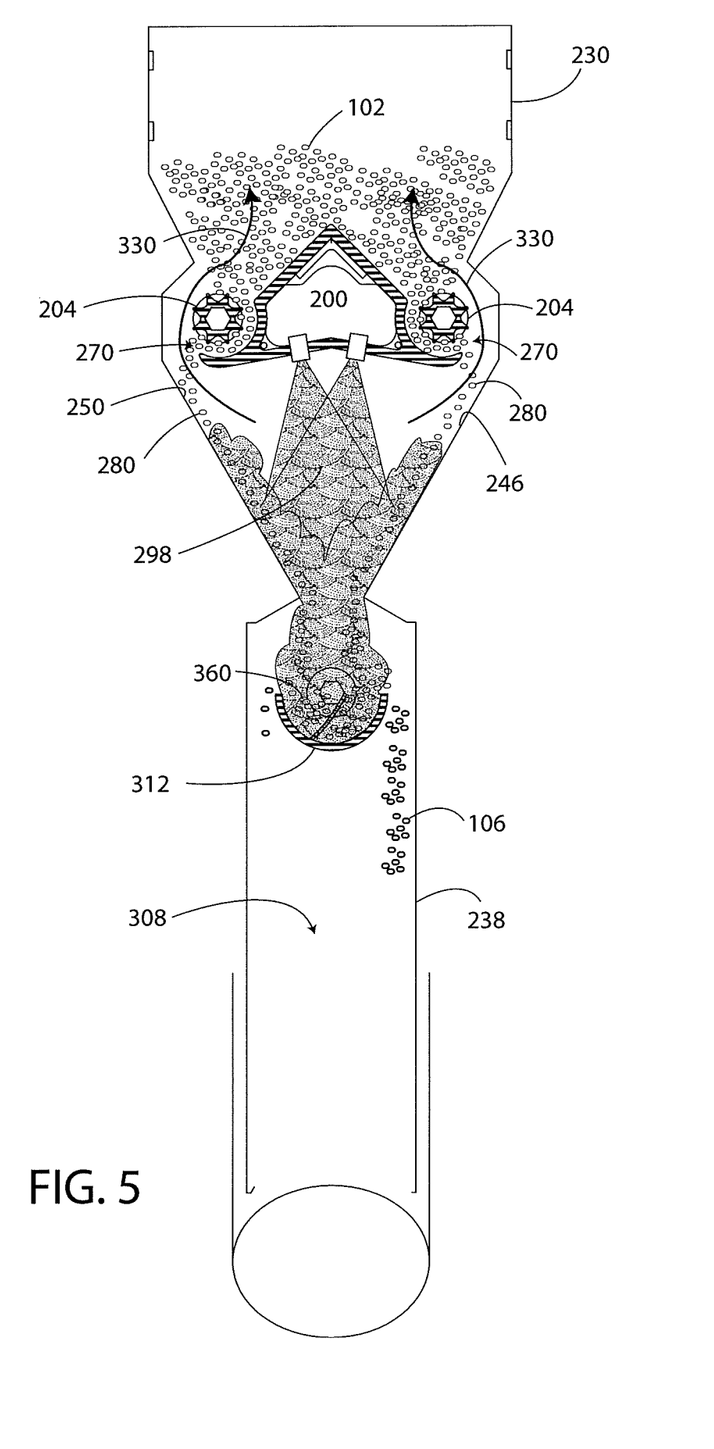
FIG. 5 is another cross-sectional view of the treating unit of the seed treating assembly of FIG. 1 shown with seeds and generating the liquid treatment spray.

In one embodiment, with reference to the orientation of the seed treatment assembly 100 as shown in FIG. 5, the left metering roller 204 is configured to rotate in a clockwise direction (i.e., a first direction), and the right metering roller 204 is configured to rotate in a counterclockwise direction (i.e., a second direction different from the first direction). The rotation of the metering rollers 204 pulls the seeds 102 along the metering surfaces 266, 268. The motor 192 rotates the wiper membrane 324 of the wiper assembly 208 in either the first or the second direction.

With continued reference to FIG. 5, the rotating metering rollers 204 move the seeds 102 into the metering channels 270, and then meter the untreated seeds 102 onto the inclined treating surfaces 246, 250 as first and second seed curtains 280.

At block 408, as the seeds 102 of the seed curtains 280 slide down the treating surfaces 246, 250, the seeds 102 pass through and contact the atomized spray 298 of the treatment 116. Thus, the seed curtains 280 are sprayed with the liquid treatment spray of the treatment 116 from the nozzles 200. Gravity causes the seeds 102 to roll down the treating surfaces 246, 250 and to roll through the atomized spray 298 so that all sides of the seeds 102 contact the atomized spray 298 and so that the seeds 102 of the seed curtains 280 are entirely coated with the treatment 116. Owing to the even distribution of the seeds 102 as the seed curtains 280, by the time the seeds 102 reach the seed exit 251, the seeds 102 tend to be mostly coated with the treatment 116 and tend to correspond to the coated seeds 106.

Next, at block 412, the seeds 102 of the seed curtains 280 are caught and/or collected in the trough 312. That is, the seeds 102 drop directly from the inclined treating surfaces 246, 250 into trough 312. Both seed curtains 280 are caught in the same trough 312 as the collected seeds 360, and the collected seeds 360 are mixed together in the trough 312 by the rotating motion of the wiper membrane 324 as rotated by the motor 192.

At block 416, while contained and/or collected in the trough 312, the collected seeds 102 are sprayed directly with the liquid treatment 116 from the nozzles 200 to receive a further coating of the liquid treatment 116. That is, the atomized spray 298 extends from the chute assembly 234 to the tunnel structure 238 so that when the collected seeds 360 are in the trough 312 the collected seeds 360 are further sprayed with the treatment 116. The same nozzles 200 that spray the seed curtains 280 as they slide down the treating surfaces 246, 250 also spray the collected seeds 360 in the trough 312. Moreover, the rotating wiper membrane 324 mixes the collected seeds 360 with the sprayed treatment 116 and tumbles the collected seeds 360 through the sprayed treatment 116 to fully coat all sides and surfaces of the collected seeds 360.

As the wiper membrane 324 rotates and nears an edge of the trough 312, at least some of the collected seeds 360 are pushed out of the trough 312 over the edge of the trough 312. The collected seeds 360 emptied from the trough 312 fall through the tunnel 308 to the auger assembly 112.

Next, at block 420 the coated seeds 106 are routed by the auger assembly 112 to the container 108 and are collected in the container 108. The coated seeds 106 are stored in the container 108 until the seeds 106 are sowed.

The controller 196 monitors the electronic weight signal from the scale 154 to determine when all of the seeds 102 have been emptied from the container 104. When the container 104 is empty and/or a below a predetermined weight value, the controller 196 stops the pumps 176 and the air compressor 180 (if equipped) to halt the flow of liquid treatment 116 from the reservoirs 120. Such an approach reduces waste of the expensive liquid treatment 116.

In embodiments having the air induction nozzles 200, during the generating of the atomized spray 298 the chute assembly 234 is filled with the pressurized air as delivered by nozzles 200. The pressurized air tends to fill the chute assembly 234 with a fog or cloud of the atomized spray 298 that very effectively coats the seeds 102. The pressurized air is provided with outlet paths 330 (FIG. 5) for evacuating the pressurized air from the chute assembly 234. The outlet paths 330 extend upwards past the metering rollers 204 and into the hopper 230. At least some treatment 116 carried by the pressurized air as it moves along the outlet paths 330 is deposited onto the seeds 102 contained in the hopper 230, and the seeds 102 in the hopper 230; therefore, operate as an air cleaner and/or air filter. Additionally, the chute assembly 234 and/or the baffle 254 may include air outlets (with or without corresponding filters) for releasing the pressurized air from the chute assembly 234.

In one embodiment, during the seed treating process (i.e., the method 400) the control unit 196 implements a loss-in-weight feeding program in which the control unit 196, the scale 154, and the motor 192 form a loss-in-weight system. When running the loss-in-weight feeding program, the scale 154 weighs the untreated seeds 102 and the container 104, and then generates the electronic weight signal, which is provided to the control unit 196. As the seeds 102 exit the container 104 through the hopper 230, the control unit 196 processes changes in the electronic weight signal (i.e. a rate of decrease of the weight) and determines an optimal rate of rotation (i.e., a rotational speed) of the metering rollers 204 and the wiper shaft 320 as controlled by the motor 192. The optimal rate of rotation is selected so that the metering rollers 204 produce even and uniform seed curtains 280 and enables the control unit 196 to accurately control the metering of the untreated seeds 102. The control unit 196 may also (i) automatically adjust the air pressure supplied to the nozzles 200 using the regulator 188, and (ii) automatically adjust the volume of liquid treatment 116 supplied to the nozzles 200 using the pumps 176 in order to optimize the seed treating process 400.

Figure 6:
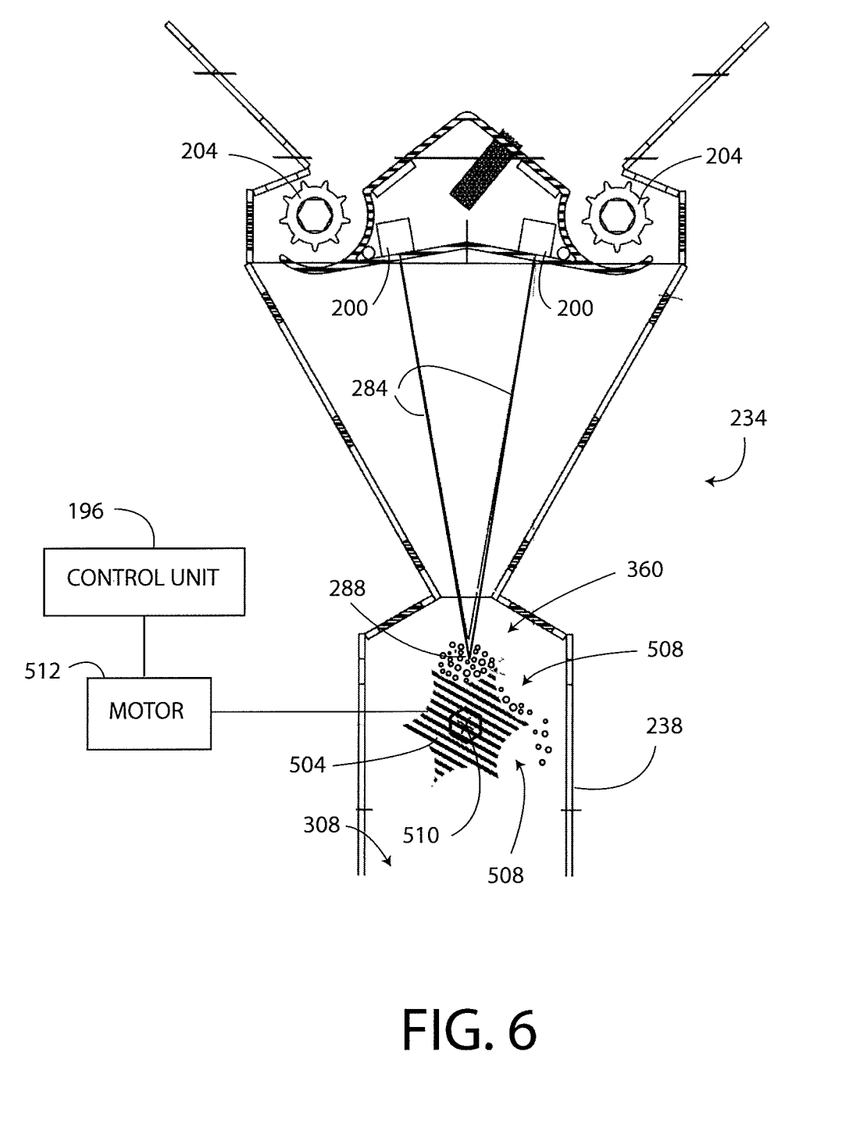
FIG. 6 is a cross-sectional view of another embodiment of a treating unit for use with the seed treating assembly of FIG. 1.

As shown in FIG. 6, in another embodiment instead of the trough 312 and wiper assembly 208, a trough wheel 504 is included that is supported by the tunnel structure 238 and is operably connected to motor 192 for rotation. The trough wheel 504 rotates about an axis of rotation 510. The trough wheel 504 includes a plurality of troughs 508 configured to catch the seeds 102 as they exit the chute assembly 234. The seeds 102 collected by the trough 508 are the collected seeds 360. Accordingly, in this embodiment, the troughs 508 are rotated about the axis of rotation 510. Due to the configuration of the nozzles 200, the collected seeds 360 are sprayed directly with the treatment 116. As the trough wheel 504 rotates, the collected seeds 360 in the trough 508 mix with each other and the treatment 116 received from the nozzles 200 to fully coat the seeds 106. The rotation of the trough wheel 504 causes the collected seeds 360 to periodically spill from the trough 508 and to fall in the tunnel 308, where the seeds 106 are collected by the auger assembly 112.

In one embodiment, the control unit 196 is configured to stop and to start rotation of the trough wheel 504 independently of the rotation of the metering rollers 204. For example, the control unit 196 controls a motor 512 operably connected to the trough wheel 504 to cause the trough wheel 504 to stop rotating during the rotation of the metering rollers 204 so that one of the troughs 508 more fully fills with the collected seeds 360. The rotation of the trough wheel 504 is stopped for a predetermined time period. Then, the control unit 196 controls the motor 512 to restart the rotation of the trough wheel 504 for a second predetermined time period. When the trough wheel 504 rotates, the more fully collected seeds 106 are mixed with the treatment 116 until the trough 508 is rotated to a point that empties the seeds 360 from the trough 508.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A seed treating assembly, comprising:
a chute assembly including a first inclined treating surface and a second inclined treating surface spaced apart from the first inclined treating surface;
a first metering roller supported by the chute assembly and configured to meter a first seed curtain of seeds to the first inclined treating surface;
a second metering roller supported by the chute assembly and configured to meter a second seed curtain of seeds to the second inclined treating surface;
at least one nozzle supported by the chute assembly, the at least one nozzle configured to spray directly the first seed curtain and the second seed curtain with a liquid treatment spray;
a tunnel structure extending from the chute assembly;
a trough supported by the tunnel structure;
a wiper shaft supported by the tunnel structure and configured to rotate, a wiper membrane extending from the wiper shaft; and
a baffle assembly supported by the chute assembly, the baffle assembly defining (i) a first inclined guide surface, (ii) a second inclined guide surface that meets the first inclined guide surface at a peak, (iii) a first curved metering surface extending from the first inclined guide surface, and (iv) a second curved metering surface extending from the second inclined guide surface,
wherein the trough is configured to collect the first seed curtain and the second seed curtain as collected seeds,
wherein the at least one nozzle is configured to spray directly the collected seeds in the trough with the liquid treatment spray,
wherein the rotation of the wiper shaft moves the wiper membrane to empty the collected seeds from the trough,
wherein a first metering channel is defined between the first metering roller and the first curved metering surface,
wherein a second metering channel is defined between the second metering roller and the second curved metering surface,
wherein the seeds of the first seed curtain fall from the first curved metering surface onto the first inclined treating surface based on rotation of the first metering roller, and
wherein the seeds of the second seed curtain fall from the second curved metering surface onto the second inclined treating surface based on rotation of the second metering roller.

2. The seed treating assembly as claimed in claim 1, wherein the baffle assembly further comprises:
a nozzle plate extending between the first curved metering surface and the second curved metering surface;
wherein the at least one nozzle is mounted on the nozzle plate.

3. The seed treating assembly as claimed in claim 1, wherein:
the at least one nozzle includes a first nozzle and a second nozzle,
the first nozzle defines a first spray axis,
the second nozzle defines a second spray axis, and
an intersection of the first spray axis and the second spray axis is located in the tunnel structure between (i) the trough, and (ii) the first and the second inclined treating surfaces.

4. The seed treating assembly as claimed in claim 1, wherein:
the first metering roller defines a first axis of rotation,
the second metering roller defines a second axis of rotation,
the wiper shaft defines a third axis of rotation, and
the first axis of rotation, the second axis of rotation, and the third axis of rotation are substantially parallel and non-coaxial.

5. The seed treating assembly as claimed in claim 1, wherein:
gravity moves the seeds across the first and the second inclined treating surfaces and to the trough.

6. The seed treating assembly as claimed in claim 1, wherein:
the first inclined treating surface is substantially planar, and
the second inclined treating surface is substantially planar.

7. A seed treating assembly, comprising:
a chute assembly including a first inclined treating surface and a second inclined treating surface spaced apart from the first inclined treating surface;
a first metering roller supported by the chute assembly and configured to meter a first seed curtain of seeds to the first inclined treating surface;
a second metering roller supported by the chute assembly and configured to meter a second seed curtain of seeds to the second inclined treating surface;
at least one nozzle supported by the chute assembly, the at least one nozzle configured to spray directly the first seed curtain and the second seed curtain with a liquid treatment spray;
a tunnel structure extending from the chute assembly;
a trough supported by the tunnel structure; and
a wiper shaft supported by the tunnel structure and configured to rotate, a wiper membrane extending from the wiper shaft,
wherein the trough is configured to collect the first seed curtain and the second seed curtain as collected seeds,
wherein the at least one nozzle is configured to spray directly the collected seeds in the trough with the liquid treatment spray,
wherein the rotation of the wiper shaft moves the wiper membrane to empty the collected seeds from the trough,
wherein the first metering roller defines a first axis of rotation,
wherein the second metering roller defines a second axis of rotation,
wherein the wiper shaft defines a third axis of rotation, and
wherein the first axis of rotation, the second axis of rotation, and the third axis of rotation are substantially parallel and non-coaxial.

8. The seed treating assembly as claimed in claim 7, wherein:
gravity moves the seeds across the first and the second inclined treating surfaces and to the trough.

9. The seed treating assembly as claimed in claim 7, further comprising:
a baffle assembly supported by the chute assembly,
wherein the at least one nozzle includes at least one air induction nozzle mounted on the baffle assembly,
wherein an air supply line having a supply of pressurized air is connected to the at least one air induction nozzle,
wherein a liquid treatment supply line having the liquid treatment is connected to the at least one air induction nozzle, and
wherein the baffle assembly defines a wiring tunnel through which the air supply line and the liquid treatment supply line extend.

10. The seed treating assembly as claimed in claim 7, wherein:
the at least one nozzle includes a first nozzle and a second nozzle,
the first nozzle defines a first spray axis,
the second nozzle defines a second spray axis, and
an intersection of the first spray axis and the second spray axis is located in the tunnel structure between (i) the trough, and (ii) the first and the second inclined treating surfaces.

11. The seed treating assembly as claimed in claim 7, wherein:
the first inclined treating surface is substantially planar, and
the second inclined treating surface is substantially planar.

12. The seed treating assembly as claimed in claim 7, further comprising:
a baffle assembly supported by the chute assembly, the baffle assembly defining (i) a first inclined guide surface, (ii) a second inclined guide surface that meets the first inclined guide surface at a peak, (iii) a first curved metering surface extending from the first inclined guide surface, and (iv) a second curved metering surface extending from the second inclined guide surface.

13. The seed treating assembly as claimed in claim 12, wherein:
a first metering channel is defined between the first metering roller and the first curved metering surface,
a second metering channel is defined between the second metering roller and the second curved metering surface,
the seeds of the first seed curtain fall from the first curved metering surface onto the first inclined treating surface based on rotation of the first metering roller, and
the seeds of the second seed curtain fall from the second curved metering surface onto the second inclined treating surface based on rotation of the second metering roller.

14. The seed treating assembly as claimed in claim 13, wherein the baffle assembly further comprises:
a nozzle plate extending between the first curved metering surface and the second curved metering surface;
wherein the at least one nozzle is mounted on the nozzle plate.

* * * * *